Jan. 1, 1963 W. B. McKNIGHT ET AL 3,071,036
NUTATIONAL SCANNING MIRROR

Filed Aug. 31, 1960 2 Sheets-Sheet 1

William B. McKnight
Lonnie N. McClusky
Ronald D. Cleven,
INVENTORS.

BY

ATTORNEYS.

United States Patent Office 3,071,036
Patented Jan. 1, 1963

3,071,036
NUTATIONAL SCANNING MIRROR
William B. McKnight, Somerville, and Lonnie N. McClusky, Toney, Ala., and Ronald D. Cleven, Grabill, Ind., assignors to the United States of America as represented by the Secretary of the Army
Filed Aug. 31, 1960, Ser. No. 53,315
13 Claims. (Cl. 88—1)
(Granted under Title 35, U.S. Code (1952), sec. 266)

The invention described herein may be manufactured and used by or for the Government for governmental purposes without the payment of any royalty thereon.

This invention relates to scanning devices, and more particularly to an improved nutating scanning mirror.

A number of different fields of optics and electronics use devices which can scan a field of view. Any device, which accomplishes such a result is generally referred to as a scanning device, and may take many forms. The field of infrared detection and imaging, however, usually employs a movable mirror to accomplish the scanning function, since reflective techniques generally lend themselves best to the infrared spectrum. Scanning systems often used with shorter (visible) wavelengths of light are usually unusable in the infrared region because of the lower energy content of infrared rays.

It is the object of this invention to provide an improved rotating scanning mirror assembly which is substantially free of extraneous vibrations.

It is a more specific object of this invention to provide a scanning mirror having a nutational motion. An additional object of this invention is to provide a nutational scanning mirror and mirror drive which is capable of producing either a circular scan, or a spiral scan.

As will be seen on further examination of this device, the desirable properties of freedom from vibration and variable nutational scanning motion are attained by a simple but novel means of actuating the mirror without intermediate mechanical coupling.

In accordance with the invention the mirror, a paramagnetic disc, is balanced symmetrically just above electromagnets equally spaced in a circle. The electromagnets are sequentially driven to produce nutation of the mirror due to the sequential magnetic forces applied to the mirror by the electromagnets. The upper surface of the mirror is specularly reflective.

Figure 1:
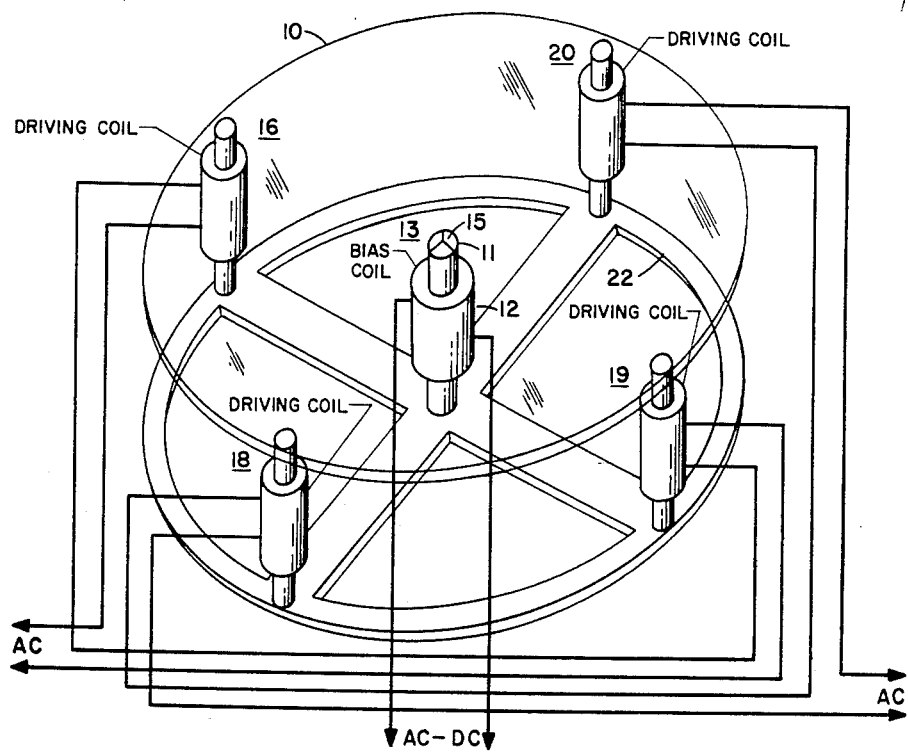
Figure 2:
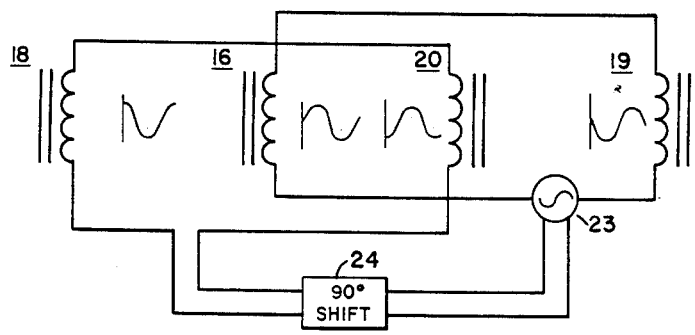
Figure 2A:
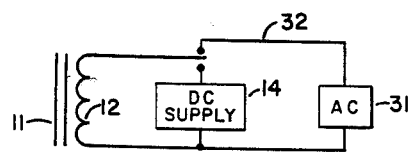
Figure 3:
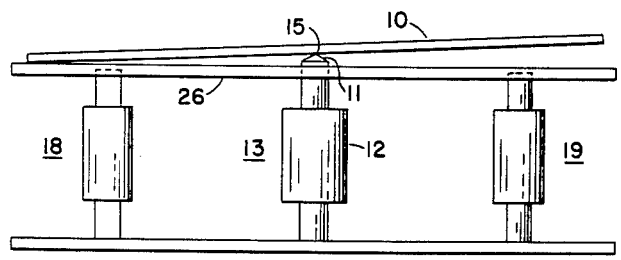
Figure 4:
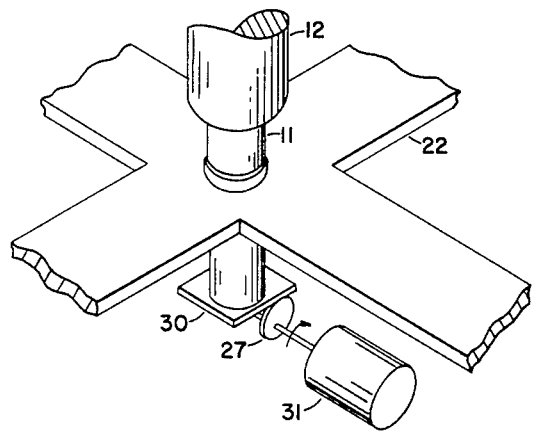

This invention may be more thoroughly understood by examination of the following specification in conjunction with the attached drawings in which:

FIGURE 1 shows a phantom view of an embodiment of the invention;
FIGURE 2 shows a block diagram of the electrical circuit of the invention;
FIGURE 2A shows the signal source in schematic form that is connected to the central electromagnet;
FIGURE 3 shows a side view of a modification of the embodiment of the device in FIGURE 1; and
FIGURE 4 shows an alternate means of producing a spiral type scan.

Referring now to FIGURE 1, a disc-shaped flat mirror 10, made from a low reluctance paramagnetic material, is balanced on a central pivot point 11. This pivot point is also made from a low reluctance paramagnetic material, and forms the core for an electromagnet 13 which is activated by a direct current flow through coil 12 from a direct current source 14, as shown in FIGURE 2A. Energizing electromagnet 13 magnetizes the mirror 10 through the extreme bearing point of contact 15 of pivot point 11. With a direct current applied, a steady magnetic field or bias exists uniformly through mirror 10. This bias is not necessary for the operation of the device, however the preferred embodiment uses the bias. Directly beneath the outer edge of mirror 10, and spaced at 90° intervals at points equidistant from the center, are located four spaced electromagnets 16, 18, 19 and 20, magnetically separated from the back of mirror 10 by a small gap. These electromagnets 16, 18, 19 and 20 are attached to a paramagnetic framework 22 which supports them rigidly. This same framework 22 supports the central electromagnet 13, and forms a magnetic path for all electromagnets. The coils of electromagnets 16, 18, 19 and 20 are connected to a source of alternating current 23 as shown in FIGURE 2, and to a 90° phase shifting network. Coils 16 and 19 are oppositely connected to source 23 and coils 18 and 20 are connected oppositely, through 90° phase shifter 24 to source 23. Thus, when driven by alternating current source 23, electromagnet 16 lags the phase of electromagnet 18 by 90°, electromagnet 18 lags the phase of electromagnet 19 by 90°, and electromagnet 19 lags the phase of electromagnet 20 by 90°. The fields produced by electromagnets 16, 18, 19 and 20 interact with, aid or oppose, the field of the mirror 10 induced by electromagnet 13 to produce a tilting force on mirror 10. As the phase of the forces of electromagnets 16, 18, 19 and 20 changes, the direction of tilt of the mirror will change to keep pace with this change in phase. This nutational movement of the mirror occurs at the rate of one revolution per cycle of alternating current.

FIGURE 3 shows a modification of FIGURE 1 in which additional stability is provided by the inclusion of circular track 26 upon which the mirror rolls. This may be employed for circular scanning or spiral scanning where the techniques illustrated in FIGURE 4 is used.

If a spiral scan is desired, an alternating current of a lower frequency as for example a submultiple frequency of that imposed on electromagnets 16, 18, 19 and 20, is applied to the electromagnet 13 from A.C. source 31 (FIGURE 2A) through switch 32 to produce an increasing and decreasing field in mirror 10, which will change the mirror tilt by changing the attraction between mirror 10 and electromagnets 16, 18, 19 and 20 at an alternating current rate.

Another technique for producing a spiral or complex scan cycle is shown in FIGURE 4, in which the central electromagnet-pivot assembly 11, 12 and 13 is moved mechanically, as by the eccentric 27 and plate 30 assembly driven by motor 31.

It may be seen from the above exposition that the technique shown here for producing a nutational scanning mirror is versatile and will suggest many other applications and modifications of the embodiment of the invention illustrated. It is therefore desired that, in construing the breadth of the appended claims, they shall not be limited to the specific applications shown and described.

Therefore, what it is desired to be secured by Letters Patent of the United States is:

1. A nutating scanning mirror assembly comprising a circular paramagnetic support structure, a pivotal bearing generally centrally located on said support structure, said pivotal bearing being made of magnetic material, four circumferentially spaced electromagnets attached to said support structure, a paramagnetic mirror generally dynamically balanced on said bearing, said bearing contacting centrally and being magnetically coupled to a lower surface of said mirror, said upper surface of said mirror being specularly reflective, said lower surface of said mirror being in a proximate spaced relationship with said electromagnets so that magnetic coupling can take place between the mirror and the electromagnets, and means for successively energizing said four circumferentially spaced electromagnets so as to cause the mirror to scan in a nutational manner.

2. A nutating scanning mirror assembly comprising an essentially circular paramagnetic support structure, a first electromagnet having a magnetic core, a pivotal bearing comprising said core of said electromagnet, a plurality of circumferentially spaced second electromagnets attached to said support structure, a paramagnetic mirror having upper and lower surfaces, said bearing contacting centrally a lower surface of said mirror and supporting said mirror, said upper surface of said mirror being being specularly reflective, said lower surface of said mirror being separated by an air gap from said second electromagnets, alternating current means for energizing successively said second electromagnets with a phase advance differing by the angular difference in position of successive second electromagnets.

3. A nutating scanning mirror comprising an essentially circular paramagnetic support structure, a pivotal bearing generally centrally located on said support structure, a first electromagnet having a magnetic core, said pivotal bearing comprising said core, four circumferentially spaced second electromagnets separated by 90° and attached to said support structure, said second electromagnets being connected to a source of phased alternating current to provide each successive second electromagnet coil a 90° phase advance with respect to the circumferentially preceding coil, a paramagnetic mirror generally dynamically balanced on said bearing, said bearing contacting centrally a lower surface of said mirror, an upper surface of said mirror being specularly reflective, said lower surface of said mirror being magnetically coupled through an air gap with said second electromagnets.

4. A nutating scanning mirror assembly as set forth in claim 3 in which said pivotal bearing electromagnet core is energized by an alternating current potential.

5. A nutating scanning mirror assembly as set forth in claim 3 in which said pivotal bearing electromagnet includes means to produce oscillatory motion perpendicular to said mirror.

6. A nutating scanning mirror assembly as set forth in claim 3 wherein said mirror is circular and said assembly further comprises a circular track, said track being supported by said support structure, the edge of said lower surface of said mirror rollably engaging said track when said mirror is in a tilted position.

7. A scanning mirror assembly comprising: a paramagnetic support; a plurality of electromagnets disposed on said paramagnetic support; means for energizing said electromagnets; a track seated on said electromagnets; bearing means connected to said paramagnetic support and extending through said track; a paramagnetic mirror carried on said track and said bearing means, whereby energizing said electromagnets magnetically couples said mirror to said bearing means and said track causing the mirror to scan in a nutational motion.

8. A device set forth in claim 7, further comprising mechanical means for providing eccentric motion to said bearing means.

9. A scanning mirror assembly comprising: a paramagnetic support; a pivotal bearing centrally located on said support structure; a first electromagnet having a magnetic core, said pivotal bearing comprising said core; means for energizing said first electromagnet; a plurality of circumferentially spaced electromagnets attached to said support; means for energizing said plurality of electromagnets; a track disposed on said plurality of electromagnets; a paramagnetic mirror carried on said track and said bearing means, whereby energizing said first electromagnet and said plurality of electromagnets magnetically couples said mirror to said bearing means and said track causing the mirror to scan in a nutational manner.

10. A scanning mirror assembly comprising a paramagnetic sheet having a mirror surface and a supporting surface, pivotal support means including a contact area, the supporting surface of said sheet resting on said contact area and being positioned to balance said sheet on said contact area, first, second, third and fourth electromagnets being positioned with respect to said contact area and magnetically coupled to the paramagnetic sheet to exert balanced magnetic tilting forces on said sheet at 90° intervals measured about an axis perpendicular to said sheet and through the balance point of said sheet resting on said contact area, a paramagnetic support means attached to and supporting said pivotal support means and said electromagnets, said pivotal support means comprising bias means for applying a magnetic bias between said paramagnetic support means and said balance point of said paramagnetic sheet, said electromagnets positioned on said paramagnetic support means to provide a flux path which produces said magnetic tilting forces said flux path extending through at least one of said electromagnets, the paramagnetic support means, the pivotal support means and said paramagnetic sheet, and power means connected to said electromagnets for energizing said first, second, third and fourth electromagnetics sequentially in that order.

11. The assembly set forth in claim 10 wherein said bias means comprises an electromagnet.

12. The assembly set forth in claim 11 further comprising a direct current source connected to said bias means.

13. The assembly set forth in claim 11 further comprising a source of alternating current of a lower frequency than said first named source of alternating current, and said lower frequency current source as connected to said bias means electromagnet.

References Cited in the file of this patent

UNITED STATES PATENTS

| | | |
|---|---|---|
| 1,525,551 | Jenkins | Feb. 10, 1925 |
| 2,419,999 | Leck | May 6, 1947 |
| 2,630,736 | Beitz | Mar. 10, 1953 |
| 2,691,306 | Beams et al. | Oct. 12, 1954 |
| 3,011,124 | Hermann | Nov. 28, 1961 |

FOREIGN PATENTS

| | | |
|---|---|---|
| 1,149,437 | France | July 8, 1957 |